United States Patent
Fontana, Jr. et al.

(10) Patent No.: US 6,821,715 B2
(45) Date of Patent: Nov. 23, 2004

(54) FULLY UNDERCUT RESIST SYSTEMS USING E-BEAM LITHOGRAPHY FOR THE FABRICATION OF HIGH RESOLUTION MR SENSORS

(75) Inventors: Robert Edward Fontana, Jr., San Jose, CA (US); Jordan A. Katine, San Jose, CA (US); Jennifer Liu, San Jose, CA (US); Scott A. MacDonald, San Jose, CA (US); Michael J. Rooks, Briarcliff Manor, NY (US); Hugo Alberto Emilio Santini, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 311 days.

(21) Appl. No.: 09/853,345

(22) Filed: May 10, 2001

(65) Prior Publication Data

US 2002/0167764 A1 Nov. 14, 2002

(51) Int. Cl.[7] .................................................. G11B 5/39
(52) U.S. Cl. ...................... 430/320; 430/314; 430/319; 430/296; 29/603.07; 29/603.18
(58) Field of Search ................................. 430/314, 319, 430/296, 320; 29/603.07, 603.18

(56) References Cited

U.S. PATENT DOCUMENTS 5,079,035 A    1/1992   Krounbi et al. ............. 427/130
6,187,513 B1 *  2/2001  Katakura .................... 430/312
6,493,926 B2 * 12/2002  Han et al. ................. 29/603.14

FOREIGN PATENT DOCUMENTS

JP    2001-028110 A    *   1/2001
JP    2001-043515 A    *   2/2001

OTHER PUBLICATIONS

"Chemistry of Ketal Resist System and its Lithographic Performance", Huang et al., pp. 95–109 of Micro–and Nanopatterning Polymers, American Chemical Society, Sep. 1997.*

G. J. Dolan; "Offset masks for lift–off photoprocessing;" Applied Physics Letters, vol. 31, No. 5, Sep. 1, 1977.

* cited by examiner

*Primary Examiner*—John A. McPherson
(74) *Attorney, Agent, or Firm*—Lumen Intellectual Property Services, Inc.

(57) ABSTRACT

A suspended resist bridge suitable for lithographically patterning MR sensors having trackwidths narrower than 0.2 micron is fabricated using the method of the present invention. First, PMGI is spun onto a substrate to form a first thin resist layer. Next, PMMA is spun onto the first resist layer to form a second resist layer. The PMMA layer is exposed to an electron beam to pattern the trackwidth of the MR sensors. E-beam exposed PMMA is then developed in an IPA solution. The resist structure is then placed in a basic solution for dissolving PMGI, which results in a fully undercut resist bridge that is used for patterning the MR sensors.

12 Claims, 11 Drawing Sheets

FULLY UNDERCUT RESIST SYSTEMS USING E-BEAM LITHOGRAPHY FOR THE FABRICATION OF HIGH RESOLUTION MR SENSORS

FIELD OF THE INVENTION

This invention relates generally to magnetoresistive (MR) sensors. More particularly, it relates to a method of making MR sensors having a trackwidth narrower than 0.2 micron.

BACKGROUND ART

Magnetoresistive (MR) sensors for detecting and measuring magnetic fields find many scientific and industrial applications. Prior MR sensors include anisotropic magnetoresistive (AMR) sensors and giant magnetoresistive (GMR) sensors, in which a sense current flows along, or parallel to, planes of the ferromagnetic elements. Prior MR sensors also include magnetoresistive tunnel junction (MTJ) sensors, in which a sense current flows perpendicular to the planes of the ferromagnetic elements through a dielectric barrier. The resistance of a MR sensor depends on the magnetization direction of the sensor. Recorded data can be read from a magnetic medium because the external magnetic field from the recorded magnetic medium (the signal field) causes a change in the direction of magnetization in the sensor, which in turn causes a change in resistance in the sensor and a corresponding change in the sense current or voltage.

The increasing areal density of magnetic storage media requires that the magnetic recording read/write heads be able to operate at ever-decreasing track widths (TW). Both the write element and the magnetic readback sensor of the recording head must be made smaller in order to achieve narrower data tracks. For example, in the highest areal density (~20 Gbit/in$^2$) commercial products, the sensor TW, which is defined by optical lithography and ion beam milling, is approaching 0.3 micron. It is envisaged that in order to make heads suitable for recording densities of 100 Gbits/in$^2$, the sensor TW will need to be around 0.13 micron.

At present, magnetoresistive (MR) heads are typically made by photolithographically defining the MR sensor from a continuous multilayer thin film. The MR sensor is often defined in two steps, one photolithographic step to define the TW dimension, and one lapping step to define the so-called "stripe height" (SH) dimension.

Figure 1:
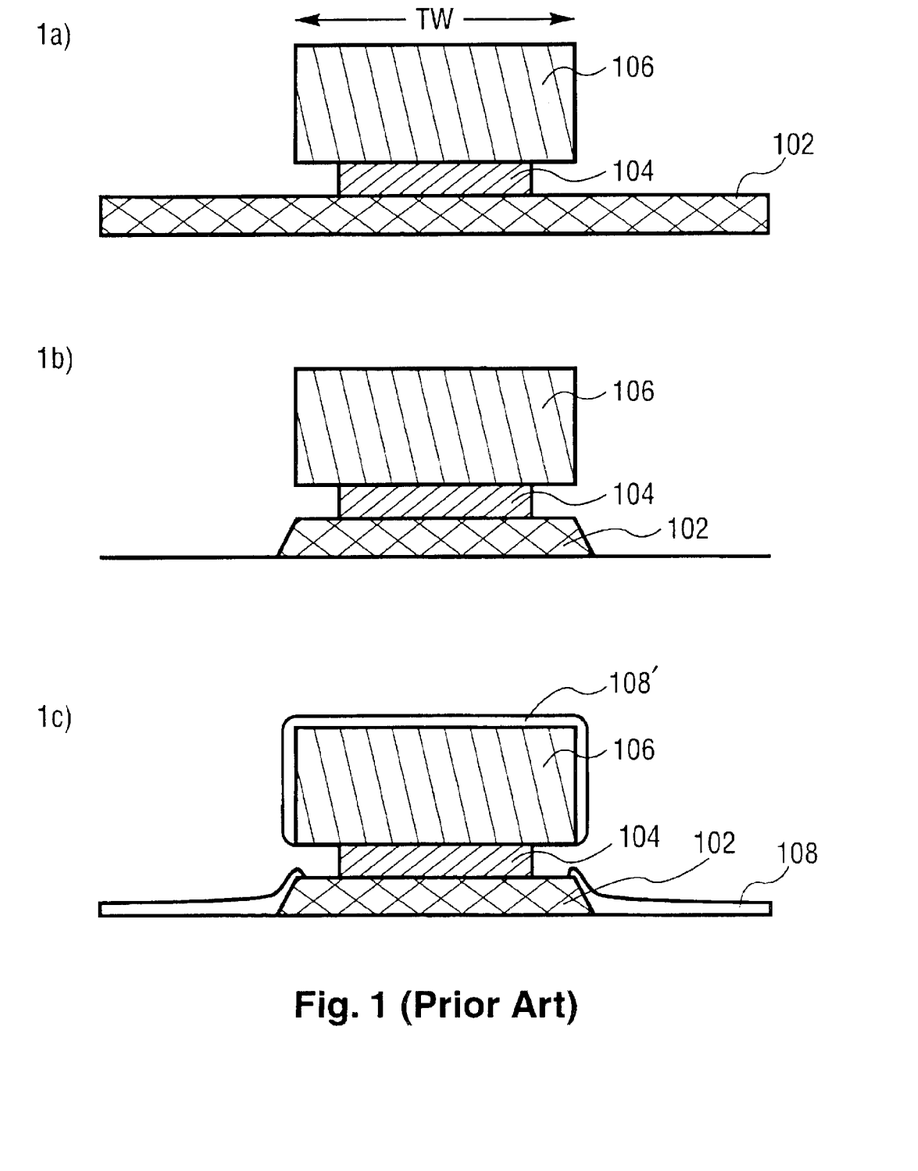
FIGS. 1a–e are schematic diagrams illustrating the steps of a process of fabricating MR sensors using a bilayer resist pedestal technique of the prior art.

In the photolithographic patterning of the TW, an undercut resist scheme is necessary for the formation of high quality junctions. The best MR sensors are fabricated using an optical lithography, bilayer resist pedestal technique. FIGS. 1a–1e illustrate the fabrication of contiguous junction hard bias MR sensors using this prior art bilayer resist pedestal technique. As shown in FIG. 1a, a bilayer resist pedestal structure includes an image resist layer 106 on top of an undercut polymer layer 104. For fabricating a GMR sensor, the bilayer resist structure stands on a GMR layer structure 102. The bilayer resist structure masks the active sensor region of the GMR layer structure 102 during an ion milling step which defines the sensor trackwidth edges as shown in FIG. 1b. The bilayer resist structure then serves as a liftoff mask for depositing the hard bias layers 108 and leads 110, which contact the edges of the sensor 102 as shown in FIGS. 1c–1d. As shown in FIG. 1d, a quantity of hard bias material 108' and lead material 110' is also deposited on the sidewalls and top of resist layer 106. However, this quantity of material is removed along with the resist layer 106 in a liftoff process described in a later step.

The undercut nature of the bilayer resist pedestal structure facilitates liftoff of the hard bias layers 108 and leads 110. The undercut also allows superior junctions to be formed between the hard bias layers 108 and the sensor 102 (by minimizing shadow effects from hard bias material 108' deposited onto the resist 106 sidewalls and by eliminating the redeposition of milled material from the GMR structure 102 onto the resist 106 sidewalls). FIG. 1e shows the sensor 102 with contiguous hard bias layers 108 and leads 110 after a liftoff process for removing the bilayer resist pedestal structure.

Figure 2:
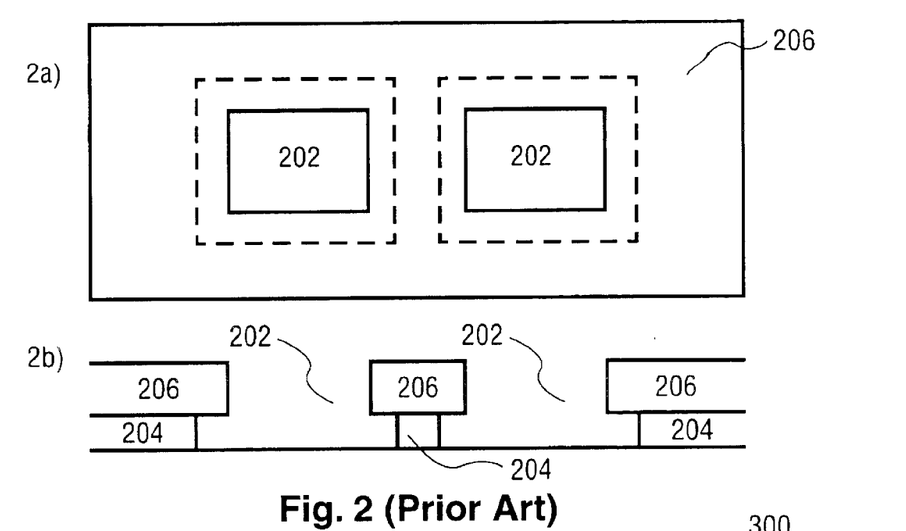
FIGS. 2a–b are schematic diagrams showing top and side views of a bilayer resist pedestal structure of the prior art.

Undercut bilayer resist systems of the type depicted in FIGS. 1a–1e can be fabricated using e-beam lithography rather than photolithography. The present sensor trackwidths of 0.3 micron are already beginning to push the resolution limits of I-line photolithography. Fundamental constraints such as the diffraction limit of light make photolithographically patterning sub-0.2 micron TW sensors with I-line radiation practically impossible. Electron beam lithography has no such resolution limits, which make it an attractive (but by no means the only) choice for patterning ultranarrow trackwidth MR sensors. FIGS. 2a–2b are schematic diagrams illustrating the top and side views of a bilayer resist pedestal using an e-beam resist chemistry technique. An e-beam sensitive image resist layer 206 is deposited on a resist layer 204, which cannot be seen in FIG. 2a. The open regions 202 on the image resist layer 206 are formed by exposing those regions to an electron beam and then dissolving the exposed resist in a suitable developer. The undercut is then formed by using an appropriate developer to dissolve the bottom resist layer, where the undercut distance is determined by the develop time.

Despite the high resolution of e-beam lithography, the bilayer resist pedestal technique described above becomes intractable for achieving trackwidths narrower than 0.2 micron. One reason for this is that forming such narrow pedestals requires controlling the resist undercut to a precision of hundredths of a micron. More fundamentally, the bilayer resist pedestal cannot be extended below 0.2 micron because the top resist layer would collapse unless the amount of undercut used in the present bilayer resist pedestal structure were significantly reduced. This is not an option because reducing the undercut would adversely affect the liftoff process and the junction quality. One might imagine that those difficulties could be circumvented by reducing the thickness of the GMR layer, which would allow the thickness and width of the bilayer resist pedestal to be scaled accordingly. This is not an option, though, because significant reduction of the GMR layer thickness is not possible.

U.S. Pat. No. 5,079,035 issued to Krounbi et al. on Jan. 7, 1992, discloses a method for fabricating a magnetoresistive transducer with contiguous junctions between a MR layer and hard bias layers using a bilayer resist pedestal structure as described above. As stated above, the method disclosed by Krounbi et al. cannot fabricate a MR sensor with a trackwidth narrower than 0.2 micron.

A bridge structure is described in an article entitled "Offset masks for lift-off photoprocessing" by G. J. Dolan published on Jun. 21, 1977 in *Applied Physics Letters*. Using photolithography, Dolan fabricated micron-scale, suspended resist structures with micron dimensions in bridge width, bridge height, and in bridge separation from the substrate surface. By using this bridge as a mask for oblique angle thin-film deposition, small-area Josephson Junctions could be fabricated. However, the width of the bridge formed by this technique is 1.5 micron, which is far too large to be used for making MR sensors with narrow trackwidths.

There is a need, therefore, for a resist structure suitable for lithographically patterning MR sensors with trackwidths narrower than 0.2 micron.

SUMMARY

According to an exemplary embodiment of the present invention, a fully undercut resist bridge structure to pattern MR sensors is formed by totally removing the bottom resist layer of a bilayer resist structure in the trackwidth region.

The fully undercut resist bridge structure is formed by using two polymer layers, with only the top polymer layer being sensitive to electron beam exposure and to the e-beam developer. Alternatively, short wavelength radiation (DUV, X-ray, and the like) could also be used to pattern the top polymer layer. In a preferred embodiment, the top polymer layer is made of an e-beam sensitive resist such as polymethyl methacrylate (PMMA). However, this imaging layer could be virtually any deep ultraviolet (DUV) resist (either positive or negative). The bottom polymer layer typically contains polymethyl glutarimide (PMGI).

E-beam exposed PMMA dissolves in a solution of isopropyl alcohol (IPA) and water. PMGI is not affected by this solution, regardless of whether it has been exposed to an electron beam. PMGI dissolves in a basic developer having concentrations of NaOH or KOH that do not affect the PMMA. Therefore, e-beam exposure and development of the PMMA layer will not affect the PMGI layer, and dissolving the PMGI layer will not affect the edges of the PMMA walls. When the top polymer layer contains DUV resist, a single developer, such as a basic developer of NaOH or KOH, can be used to develop both the e-beam exposed DUV and PMGI.

The fully undercut resist bridge of the present invention is fabricated by spinning PMGI to form a bottom thin resist layer on a substrate. A top thin resist layer is formed by spinning PMMA on the bottom resist layer. The top resist layer is then exposed to an electron beam in a bridge pattern defining the trackwidth of MR sensors. The E-beam exposed PMMA layer is then developed in a second developer, such as an IPA and water solution. The IPA/water solution removes the exposed PMMA but not the underlying PMGI material. Hence, by simply dissolving the PMGI layer for a sufficiently long time so that all the PMGI is removed in the trackwidth region, a dimensionally stable undercut bridge structure suspended above the substrate is formed, with a bridge width less than 0.2 micron, a bridge thickness less than 0.5 micron, and a bridge-substrate separation less than 0.1 micron.

The undercut resist bridge structure is used for lithographically patterning MR sensors. After patterning the bridge on top of the MR layer structures, the MR layer structure is subjected to ion milling in order to define the MR sensor TW. For a GMR sensor, magnetic hard bias layers are deposited in the passive regions at the abutting junctions on both sides of the GMR sensor to produce longitudinal bias for the sensor. Leads are then deposited on the hard bias layers for transmitting electrical signals. The resist bridge is then removed from the GMR sensor in a liftoff process.

Because it defines the gap between the bridge and the substrate, the thickness of the bottom resist layer is critical in the process flows outlined above. If the gap is too large (>0.1 micron), hard bias and lead material can be deposited under the bridge and on top of the MR sensor, creating a shunt that limits the device sensitivity. If the gap is too thin (<0.04 micron) the redeposition of material onto the sides of the PMMA during ion milling may not be prevented. In addition, capillary action could cause the bridge to collapse during processing. The thickness of the top resist layer is also critical. This resist layer must be thick enough to give structural stability to the bridge. The thickness must also be sufficient to withstand milling through the GMR material layers of a thickness of between 0.04 micron and 0.06 micron. As the second resist layer becomes thicker, though, the resolution of the electron beam lithography will suffer. In general, for a 100 keV electron exposure, the minimum TW attainable is approximately one-tenth the resist thickness.

The suspended resist bridge structure is also suitable for defining narrow TW MTJ sensors. Following patterning of the bridge structure, ion milling is used to define the sensor. Next, insulating layers are deposited at the abutting junctions, before the hard bias layers are deposited. Additional insulating layers are then deposited on the hard bias layers. Using a liftoff process, the resist bridge is removed from the MTJ sensor. Finally, leads are deposited on the insulating layers in a separate process.

The method of the present invention produces MR sensors with trackwidth narrower than 0.2 micron. Furthermore, the method of the present invention allows MR sensors to be fabricated such that the ratio of the trackwidth to the sensor thickness is less than 4 to 1 (i.e., trackwidth is equal to 0.18 micron and sensor thickness is equal to 0.04 to 0.06 micron).

MR sensors produced by the method of present invention are incorporated in MR read heads. A MR read head includes a MR sensor, which is sandwiched between two gap layers and two shield layers.

MR read heads including MR sensors fabricated by the method of the present invention are then incorporated in disk drive systems. A disk drive system includes a magnetic recording disk connected to a motor and a MR read head including a MR sensor, which is fabricated by the method of the present invention, connected to an actuator. The motor spins the magnetic recording disk with respect to the MR read head, and the actuator positions the MR head relative to the magnetic recording disk.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

High areal densities in magnetic recording require a narrow MR sensor trackwidth. To achieve a trackwidth narrower than 0.2 micron, a fully suspended resist bridge can be used as a combined ion milling/liftoff mask. According to a preferred embodiment of the present invention, a bilayer resist structure includes a top polymer layer deposited on top of a bottom polymer layer with only the top (imaging) polymer layer being sensitive to e-beam exposure and to the e-beam developer. The top polymer layer contains an e-beam sensitive resist such as polymethyl methacrylate (PMMA). However, the imaging layer could be virtually any deep ultraviolet (DUV) or e-beam resists (e.g., NEB-22, SAL 601, ZEP, HSQ). The bottom polymer layer may contain polymethyl glutarimide (PMGI). The imaging resist is patterned via high energy electron beam exposure. However, other short wavelength particles or radiation could be used. E-beam exposed PMMA dissolves in a solution of isopropyl alcohol (IPA) and water that does not affect the PMGI, regardless of whether the PMGI has been exposed to e-beam energy. Therefore, the top PMMA layer is e-beam exposed and developed without affecting the bottom PMGI layer. In addition, PMGI dissolves in a basic developer having concentrations of NaOH or KOH that do not affect the PMMA. Therefore, the bottom PMGI layer is dissolved without affecting the edges of the PMMA layer. When the top polymer layer contains a DUV resist, a single developer can be used to develop the e-beam exposed top polymer layer and the bottom polymer layer. For example, if the top polymer layer contains DUV resist and the bottom polymer layer contains PMGI, a basic developer of NaOH and KOH can develop both the e-beam exposed DUV and PMGI.

Figure 3:
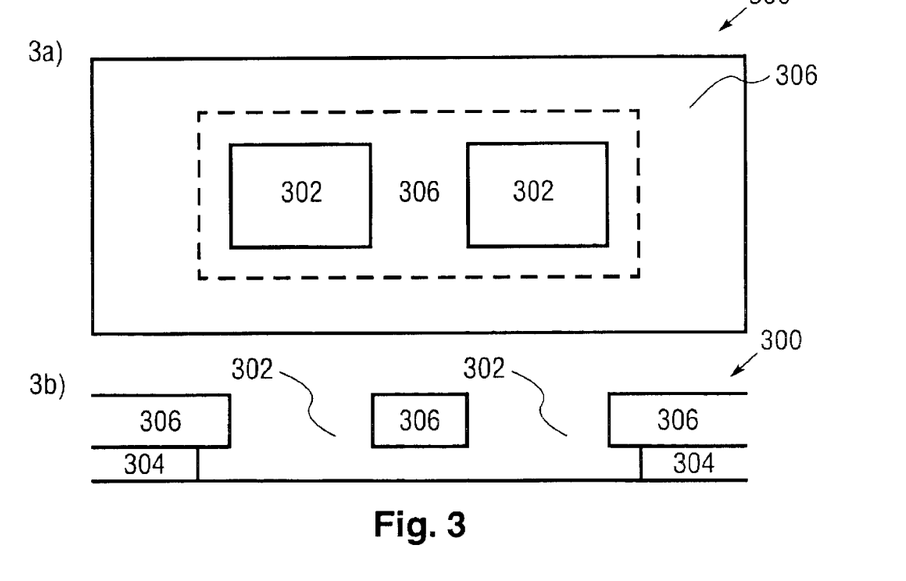
FIGS. 3a–b are schematic diagram showing top and side views of a bilayer fully undercut resist structure according to a preferred embodiment of the present invention.

FIGS. 3a–3b are schematic diagrams showing top and side views of an undercut resist structure 300 according to a preferred embodiment of the present invention. As shown in FIGS. 3a–3b, the undercut resist structure 300 includes a bridge pattern having open regions 302 and a suspended resist bridge of a top polymer 306 formed by removing part of a bottom layer 304 inside the dashed line (FIG. 3a).

Figure 4:
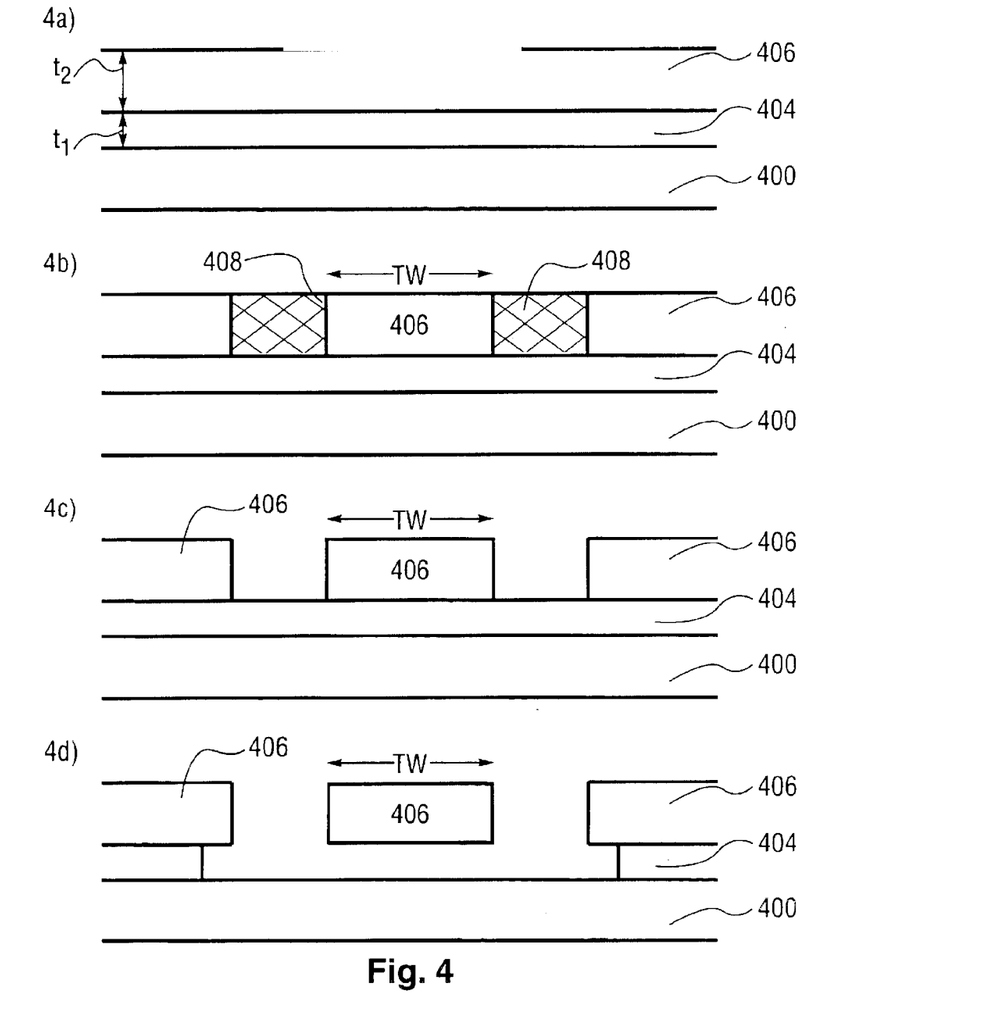
FIGS. 4a–d are schematic diagrams illustrating the steps of a process of making the bilayer fully undercut resist structure shown in FIGS. 3a–b.

A process of forming such an undercut resist structure is shown in FIGS. 4a–4d. The process is started by spinning a first polymer (e.g., PMGI) to form a uniform thin resist layer 404 on a substrate 400. Next, a second polymer (e.g., PMMA) is spun to form a uniform thin resist layer 406 on top of the bottom resist layer 404. The top resist layer 406 is then exposed to energetic particles or radiation, such as an electron beam, to produce a pattern which will define the trackwidth (TW) of the MR sensor. Regions 408 shown in FIG. 4b are portions of top resist layer 406 that are exposed to the electron beam. The top resist layer 406, with e-beam exposed regions 408, is developed in a solution of isopropyl alcohol (IPA) and water, which does not affect layer 404. The solution of IPA and water removes exposed PMMA in regions 408 as shown in FIG. 4c. The resist structure of FIG. 4c is then placed in a basic solution such as NaOH, in which the PMGI is dissolved, and then with additional time, the PMGI undercuts the PMMA wall edges. The basic solution does not attack the edges of the developed PMMA, and therefore a dimensionally stable fully undercut bridge structure, having a bridge width less than 0.2 micron, a bridge thickness less than 0.5 micron, and a bridge-substrate separation less than 0.1 micron, is formed as shown in FIG. 4d, suspended over substrate 400.

The undercut suspended resist bridge of FIG. 4d is used for lithographically patterning MR sensors, such as giant magnetoresistive (GMR) sensors and magnetoresistive tunnel junction (MTJ) sensors. FIGS. 5a–5e show a process of fabricating a GMR sensor using a fully undercut resist bridge of the type depicted in FIGS. 4a–4d.

Figure 5:
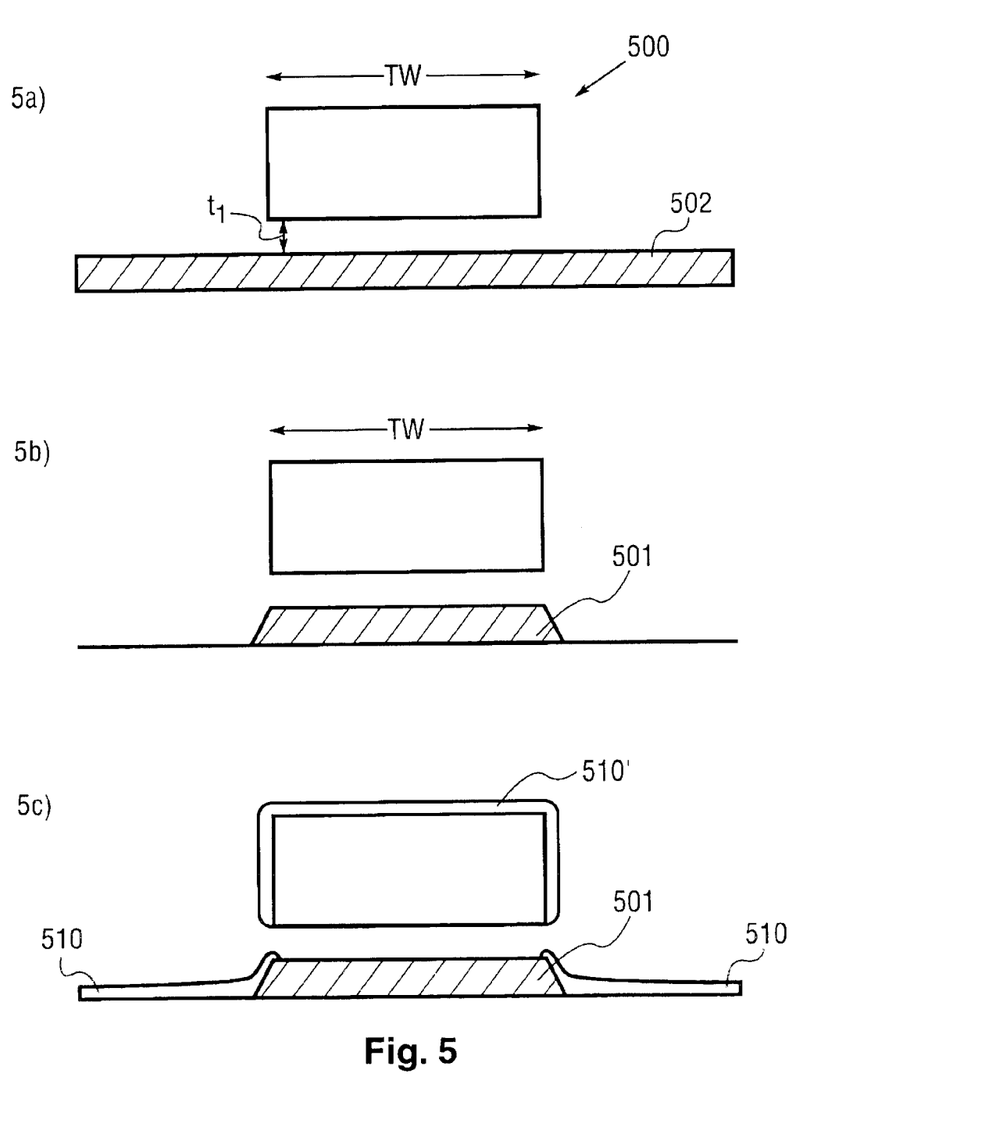
FIGS. 5a–e are schematic diagrams illustrating the steps of a process of fabricating a GMR sensor using the fully undercut resist bridge illustrated in FIGS. 4a–d.

As shown in FIG. 5a, the undercut resist bridge 500 is positioned on top of a GMR layer structure 502. Ion beam milling on the GMR layer structure 502 defines GMR sensor 501 with trackwidth equal to the width of the bridge 500, as shown in FIG. 5b. Hard bias layers 510 are then deposited on passive regions on both sides of the GMR sensor 501 as shown in FIG. 5c to produce the longitudinal bias for the MR sensor 501. Leads 512 are then deposited on top of the hard bias layers 510 as shown in FIG. 5d for transmitting electrical signals. The resist bridge 500 is then lifted off the GMR sensor by dissolving the resist in N-Methylpyrrolidone (NMP) or acetone as shown in FIG. 5e. As shown in FIGS. 5c–5d, a quantity of hard bias material 510' and lead material 512' is also deposited onto the top and sidewalls of resist bridge 500. However, this quantity of material is removed along with the resist bridge 500 in the liftoff process as shown in FIG. 5e.

Because it defines the gap between the bridge and the substrate, the thickness of the bottom resist layer $t_1$ is critical in the process flows outlined above. If the gap is too large (>0.1 micron), hard bias and lead material can be deposited on top of the MR sensor, creating a shunt that limits the device sensitivity. If the gap is too thin (<0.04 micron) the redeposition of material onto the PMMA sidewalls during ion milling may not be prevented. In addition, capillary action could cause the bridge to collapse during processing. The thickness of the top resist layer $t_2$ is also critical. This resist layer must be thick enough to give structural stability to the bridge. The thickness must also be sufficient to withstand milling through the GMR material layers of a thickness of between 0.04 micron and 0.06 micron. As the second resist layer becomes thicker, though, the resolution of the electron beam lithography will suffer. In general, for a 100 keV electron exposure, the minimum TW attainable is approximately one-tenth the resist thickness.

Figure 6:
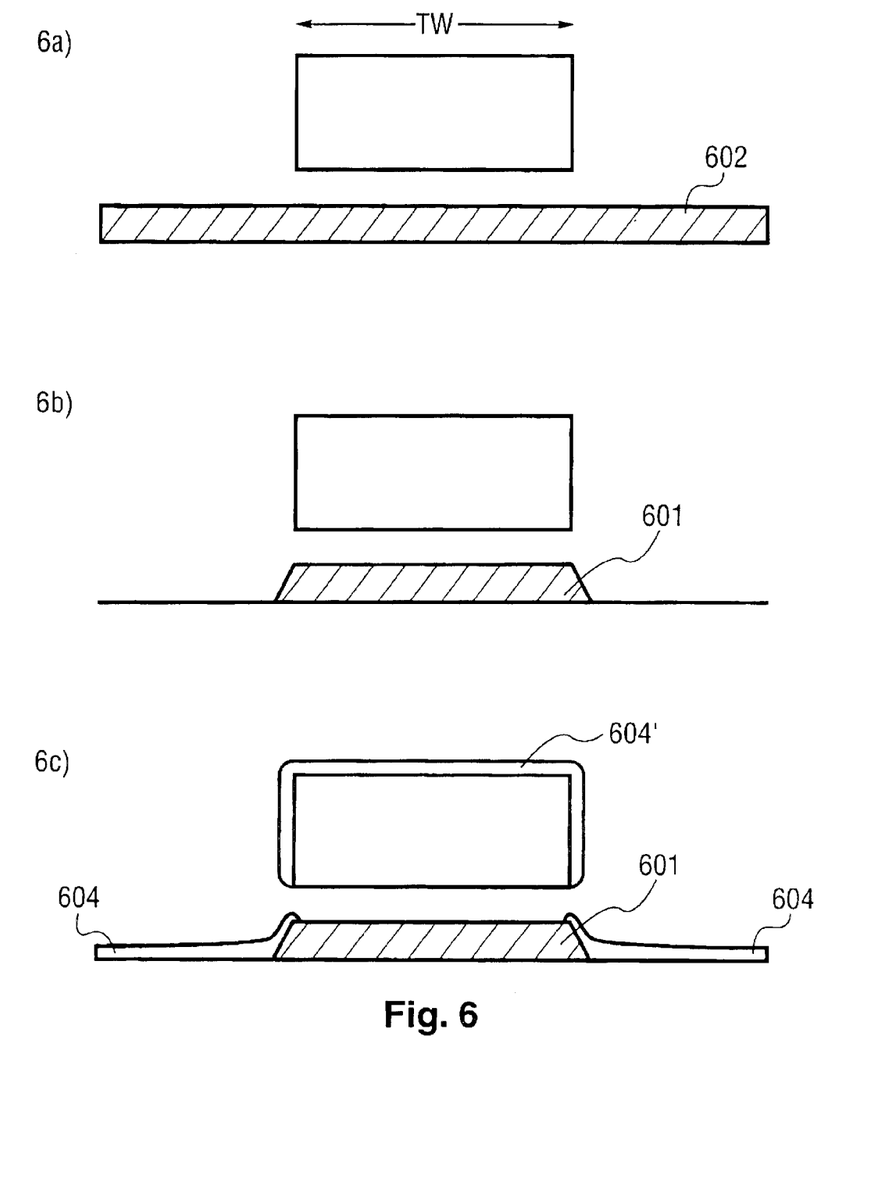
FIGS. 6a–f are schematic diagrams illustrating the steps of a process of fabricating a MTJ sensor using the fully undercut resist structure illustrated in FIGS. 4a–d.

The fully undercut resist bridge formed by the process described in FIGS. 4a–4d may also be used for fabricating MTJ sensors. FIGS. 6a–6f illustrate a process for fabricating a MTJ sensor using a fully undercut resist bridge. As shown in FIG. 6a, a fully undercut resist bridge 600 is positioned on top of a MTJ layer structure 602. Ion beam milling on the MTJ layer structure 602 defines an MTJ sensor 601 with trackwidth equal to the width of the bridge 600 (TW) as shown in FIG. 6b. Insulating layers 604 are deposited adjacent to the MTJ sensor 601 before hard bias layers 606 are deposited to form the longitudinal bias for MTJ sensor 601, as shown in FIG. 6d. Insulating layers 604 provide electrical insulation between the hard bias layers 606 and the MTJ sensor 601. Other insulating layers 608 are deposited on the hard bias layers 606 to electrically insulate the hard bias layers from leads that are deposited in a separate process, which is not shown in FIG. 6. Finally, the resist bridge 600 is removed via liftoff processing from the MTJ sensor 601 as shown in FIG. 6f. As shown in FIGS. 6c–6e, a quantity of hard bias material 606' and insulating material 604' and 608' is also deposited onto the top and sidewalls of resist bridge 600. However, this material is removed along with the resist layer 600 in a liftoff process described in FIG. 6f.

Figure 7:
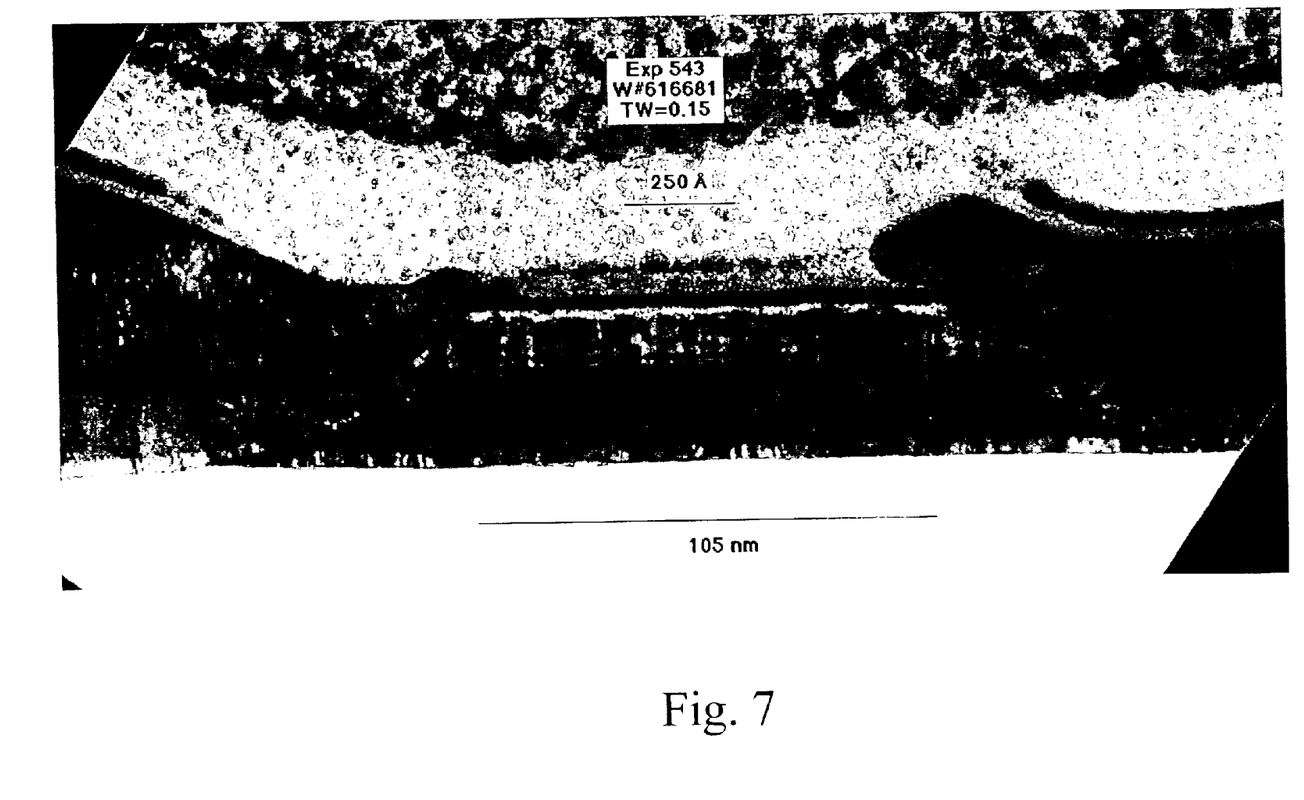
FIG. 7 is a TEM cross-section of a GMR sensor fabricated using the process described in FIGS. 5a–e.

The method of the present invention can produce MR sensors with trackwidth narrower than 0.2 micron. As described earlier, scaling the bilayer resist pedestal of the prior art cannot reliably achieve sub-0.2 micron trackwidths, primarily because the thickness of the MR layer cannot be reduced. The method of the present invention allows MR sensors to be fabricated such that the ratio of the trackwidth to the sensor thickness is less than or equal to 4 to 1 (e.g., trackwidth is equal to 0.18 micron and height is equal to 0.04 to 0.06 micron). In fact, the method of the present invention successfully fabricates the MR structures for which this ratio is 2 to 1, and with refinement, the ratio could be reduced further still. Note also that there exist no constraints that prevent the method of the present invention from making large ratio (wide TW) sensors. FIG. 7 shows a TEM cross-section of a GMR sensor fabricated using the method of the present invention with a trackwidth to the sensor thickness ratio of 2 to 1.

Figure 8:
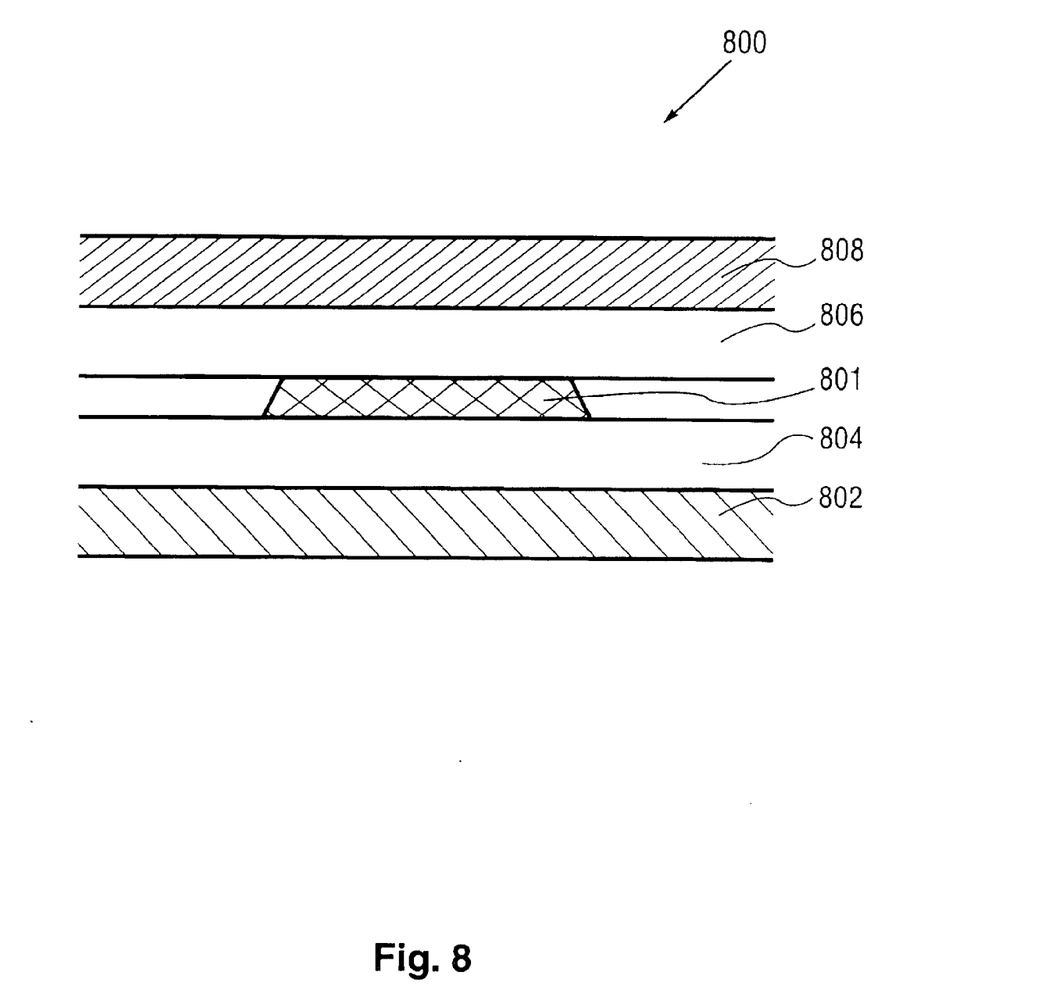
FIG. 8 is a cross-sectional schematic diagram of a MR read head including the MR sensor illustrated in FIGS. 5a–e and 6a–f.

A MR sensor having features in common with the GMR sensor 501 and the MTJ sensor 601 described above in FIGS. 5a–5e and 6a–6f with trackwidth narrower than 0.2 micron is incorporated into a MR read head 800 as shown in FIG. 8. The MR read head 800 includes a first shield 802 and second shield 808 sandwiching a MR sensor 801 having features in common with GMR sensor 501 or MTJ sensor 601 described above with respect to FIGS. 5a–5e and 6a–6f. For GMR (but not tunneling magnetoresistive, TMR) sensors the MR read head 800 further includes a first gap 804 between the first shield 802 and the MR sensor 801, and a second gap 806 between the second shield 808 and the MR sensor 801.

Figure 9:
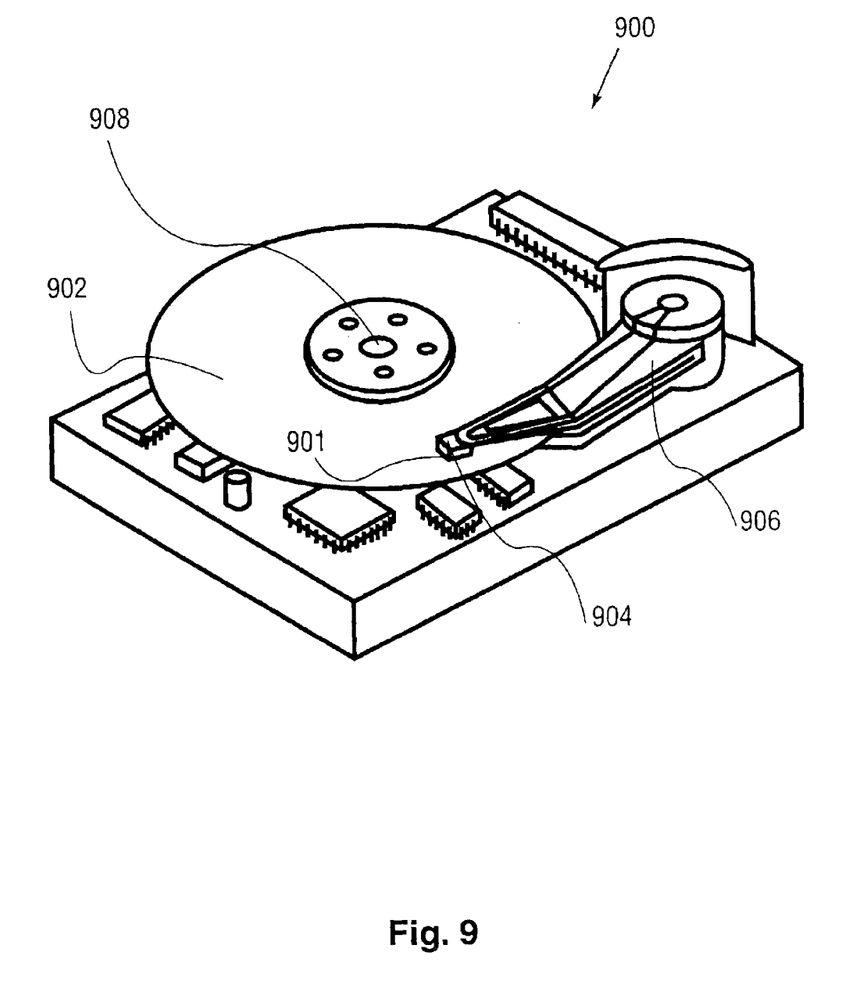
FIG. 9 is a schematic diagram illustrating a disk drive including the MR read head of FIG. B.

The MR read head of the type depicted in the FIG. 8 may be incorporated into a disk drive system 900 as shown in FIG. 9. The disk drive system 900 generally comprises a magnetic recording disk 902, a MR read head 904 containing a MR sensor 901 having features in common with the GMR 501 or MTJ sensor 601 described above, an actuator 906 connected to the read head 904, and a motor 908 connected to the disk 902. The motor 908 spins the disk 902 with respect to read head 904. The actuator 906 moves the read head 904 across the magnetic recording disk 902 so the read head 904 may access different regions of magnetically recorded data on the magnetic recording disk 902.

It will be clear to one skilled in the art that the above embodiment may be altered in many ways without departing from the scope of the invention. Accordingly, the scope of the invention should be determined by the following claims and their legal equivalents.

What is claimed is:

1. A method for fabricating a magnetoresistive (MR) sensor comprising:

a) depositing a bottom layer on a substrate, wherein the substrate is a magnetoresistive layer structure and the bottom layer comprises a first polymer;

b) depositing a top resist layer on the bottom layer, the top resist layer comprising a second polymer;

c) exposing the top resist layer to energetic particles in a bridge pattern defining a trackwidth of the MR sensor;

d) developing the exposed top resist layer with a second developer which substantially does not affect the bottom layer;

e) etching the bottom layer in a first developer to form a fully undercut resist bridge structure suspended above the substrate, wherein the resist bridge has a width narrower than 0.2 micron, and wherein the first developer substantially does not affect the top resist layer; and f) ion beam milling the magnetoresistive layer structure to form the magnetoresistive sensor, wherein the magnetoresistive sensor has a trackwidth narrower than 0.2 microns;

wherein a pattern is not formed in said bottom layer by exposure to said energetic particles or by exposure to other energetic particles.

2. The method of claim 1, wherein the energetic particles are electrons or photons.

3. The method of claim 1, wherein the thickness of the bottom layer is between 0.02 micron and 0.1 micron.

4. The method of claim 1, wherein the first polymer comprises polymethyl glutarimide.

5. The method of claim 4, wherein the first developer comprises a basic solution of NaOH or KOH.

6. The method of claim 1, wherein the second polymer comprises an e-beam sensitive resist.

7. The method of claim 6, wherein the second polymer comprises polymethyl methacrylate.

8. The method of claim 7, wherein the second developer comprises isopropyl alcohol and water.

9. The method of claim 1, wherein the second polymer comprises a deep ultraviolet resist.

10. The method of claim 9, wherein the second developer comprises a basic solution of NaOH or KOH.

11. The method of claim 1, wherein the thickness of the top resist layer is between 0.2 micron and 0.5 micron.

12. The method of claim 1, wherein the magnetoresistive sensor has a trackwidth to thickness ratio of less than or equal to 4 to 1.

* * * * *

UNITED STATES PATENT AND TRADEMARK OFFICE
CERTIFICATE OF CORRECTION

PATENT NO. : 6,821,715 B2
DATED : November 23, 2004
INVENTOR(S) : Robert Edward Fontana, Jr. et al.

It is certified that error appears in the above-identified patent and that said Letters Patent is hereby corrected as shown below:

<u>Title page</u>,
Item [75], Inventors, "Jennifer Liu" should read -- Jennifer Lu --.

Signed and Sealed this

First Day of March, 2005

JON W. DUDAS
*Director of the United States Patent and Trademark Office*